(12) United States Patent
Nurmi et al.

(10) Patent No.: US 8,564,628 B2
(45) Date of Patent: Oct. 22, 2013

(54) DISPLAY APPARATUS

(75) Inventors: Juha H-P Nurmi, Salo (FI); Jani E. Penttila, Lempaala (FI)

(73) Assignee: Nokia Corporation, Espoo (FI)

( * ) Notice: Subject to any disclaimer, the term of this patent is extended or adjusted under 35 U.S.C. 154(b) by 281 days.

(21) Appl. No.: 13/013,965

(22) Filed: Jan. 26, 2011

(65) Prior Publication Data

US 2012/0188288 A1    Jul. 26, 2012

(51) Int. Cl.
*G09G 5/10* (2006.01)

(52) U.S. Cl.
USPC ............... 345/690; 345/204; 345/87; 345/63; 345/89; 345/581

(58) Field of Classification Search
USPC ............... 345/690, 120, 12, 63, 89, 204, 581; 340/815.55
See application file for complete search history.

(56) References Cited

U.S. PATENT DOCUMENTS

| | | | |
|---|---|---|---|
| 6,515,724 B1 | 2/2003 | Drost et al. | 349/106 |
| 7,268,757 B2 * | 9/2007 | Ben-David et al. | 345/88 |
| 7,589,703 B2 | 9/2009 | Su | 345/87 |
| 2001/0052984 A1 | 12/2001 | Ookubo | 356/614 |
| 2007/0222743 A1 * | 9/2007 | Hirakata | 345/102 |
| 2008/0024418 A1 | 1/2008 | Kim | 345/98 |
| 2009/0295839 A1 | 12/2009 | Furukawa et al. | 345/690 |

FOREIGN PATENT DOCUMENTS

| | | |
|---|---|---|
| EP | 1 473 694 A2 | 11/2004 |
| EP | 1 600 929 A2 | 11/2005 |
| KR | 10-2004-0110670 | 12/2004 |
| WO | WO 97/36280 | 10/1997 |
| WO | WO 2010/014601 A2 | 2/2010 |

\* cited by examiner

*Primary Examiner* — Alexander Eisen
*Assistant Examiner* — Irasema Gonzalez
(74) *Attorney, Agent, or Firm* — Harrington & Smith (57) ABSTRACT

An apparatus including at least one light source; a selective attenuation element, used for a plurality of adjacent pixels and configured to attenuate light from the at least one light source; and a group of adjacent mono-chrome light filters, used for the plurality of adjacent pixels, the group including a first mono-chrome light filter, for a first one of the plurality of adjacent pixels, configured to filter light transmitted via the selective attenuation element for the first one of the adjacent pixels; and a second mono-chrome light filter, for a second one of the plurality of adjacent pixels, configured to filter light transmitted via the selective attenuation element for the second one of the adjacent pixels.

20 Claims, 5 Drawing Sheets

DISPLAY APPARATUS

TECHNOLOGICAL FIELD

Embodiments of the present invention relate to display apparatus. In particular, they relate to display apparatus with distinct red, green, blue pixels.

BACKGROUND

An image rendered by a display apparatus is composed of individual picture elements (pixels) that are perceived by a human as the image.

Typically, each pixel has a grayscale intensity that is individually controlled by circuitry dedicated to that pixel.

According to the examples used in this document, each picture element (pixel) has a certain color. In some literature, what we refer to as a pixel would be referred to as a sub-pixel.

BRIEF SUMMARY

According to various, but not necessarily all, embodiments of the invention there is provided an apparatus comprising: at least one light source; a selective attenuation element, used for a plurality of adjacent pixels and configured to attenuate light from the at least one light source; and a group of adjacent mono-chrome light filters, used for the plurality of adjacent pixels, the group comprising: a first mono-chrome light filter, for a first one of the plurality of adjacent pixels, configured to filter light transmitted via the selective attenuation element for the first one of the adjacent pixels; and a second mono-chrome light filter, for a second one of the plurality of adjacent pixels, configured to filter light transmitted via the selective attenuation element for the second one of the adjacent pixels.

According to various, but not necessarily all, embodiments of the invention there is provided a method comprising: controlling at a first time a selective attenuation element to attenuate light in a path between a first light source and a first mono-chrome light filter; and controlling at a second time the selective attenuation element to attenuate light in a path between a second light source and a second mono-chrome light filter.

It at least some embodiments of the invention, grayscale intensity of a pixel is controlled by a selective attenuation element that is shared by more than one pixel.

Some embodiments of the invention, share a light source between pixels that do not also share a selective attenuation element. For example, a light source may service an array of aligned pixels. The array may be, for example, an N×1 array or an N×2 array.

BRIEF DESCRIPTION

For a better understanding of various examples of embodiments of the present invention reference will now be made by way of example only to the accompanying drawings in which.

DETAILED DESCRIPTION

An image rendered by a display is composed of individual picture elements that are perceived by a human as the image. According to the examples used in this document, each picture element (pixel) has a certain color (e.g. red, green or blue) and a certain intensity. These pixels are arranged together in the clusters of different colors to enable rendering of a chosen non-primary color in the image. In some literature, what we refer to as a pixel would be referred to as a sub-pixel. This difference is however merely semantic. The term pixel used in this document is equivalent to the term sub-pixel used in some other literature.

The Figures illustrate a display apparatus 2 comprising: at least one light source 6; a selective attenuation element (SAE) 4, used for a plurality of adjacent pixels and configured to attenuate light from the at least one light source 6; and a group 10 of adjacent mono-chrome light filters 8, used for the plurality of adjacent pixels, the group 10 comprising: a first mono-chrome light filter 8, for a first one of the plurality of adjacent pixels, configured to filter light transmitted via the selective attenuation element 4 for the first one of the adjacent pixels; and a second mono-chrome light filter 8, for a second one of the plurality of adjacent pixels, configured to filter light transmitted via the selective attenuation element 4 for the second one of the adjacent pixels.

Figure 1A:
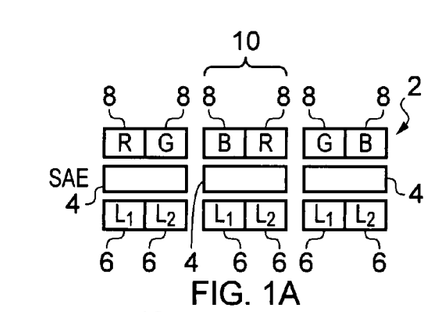
FIG. 1A illustrates an example of an apparatus in a cross-sectional view.
Figure 1B:
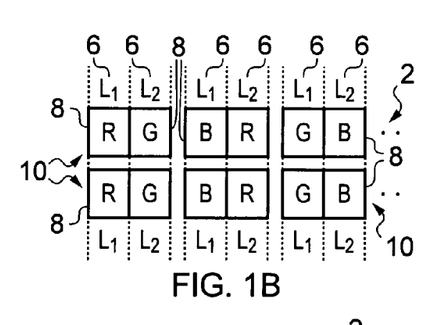
FIG. 1B illustrates the example of the apparatus from a top plan perspective.
Figure 1C:
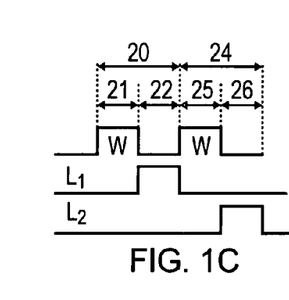
FIG. 1C illustrates an example of a timing diagram.

The FIGS. 1A to 1C illustrate an example of an apparatus 2 comprising multiple (N×M) groups 10 of pixels arranged in an N row×M column array. Each group 10 of pixels is defined by an array of n rows×m columns of mono-chrome light filters 8. In the example of FIGS. 1A-1C, n is 1 and m is 2.

FIG. 1B illustrates the apparatus 2 from a top plan perspective. FIG. 1A illustrates the apparatus 2 in a cross-sectional view taken along the horizontal in FIG. 1B.

Each pixel in a group 10 of pixels is defined by a mono-chrome light filter 8. A mono-chrome light filter 8 is labeled R for red filter if it attenuates green and blue light but allows the passage of red light, labeled G for green filter if it attenuates red and blue light but allows the passage of green light, and labeled B for blue filter if it attenuates green and red light but allows the passage of blue light.

Each group 10 of mono-chrome light filters 8 (pixels) is associated with one selective attenuation element 4, used for a plurality of adjacent mono-chrome light filters 8 (pixels) and configured to attenuate light from the at least one light source 6.

The selective attenuation element 4 may be a selectable element in a liquid crystal display (LCD). The selectable element has a nematic liquid crystal positioned between two cross-polarizers. In a first state, a first voltage is applied across a nematic liquid crystal. The change in polarization provided by the nematic liquid crystal is low and the attenuation by the selectable element is high. In a second state, a second voltage is applied across the nematic liquid crystal. The change in polarization provided by the nematic liquid crystal is high (90 degrees) and the attenuation by the selectable element is low.

In this example, each mono-chrome light filter 8 (pixel) in a group 10 is associated with a different light source 6.

Referring to FIG. 1A, there is illustrated an example where a first light source (L1) 6 underlies a blue mono-chrome light filter (B) 8 and a second light source (L2) 6, adjacent the first light source (L1) 6, underlies a red mono-chrome light filter (R) 8. The blue mono-chrome light filter (B) 8 and the red mono-chrome light filter (R) 8 are the only mono-chrome filters in a group 10. A selective attenuation element 4 is positioned between the mono-chrome light filters 8 of the group 10 and the light sources 6. The selective attenuation element 4 is used only by this group 10 of mono-chrome light filters 8.

Light generated by the underlying first light source (L1) has a path through the selective attenuation element 4, then through the first mono-chrome light filter 8 to an eye of a user.

Light generated by the underlying second light source (L2) has a path through the same selective attenuation element 4, then through the second mono-chrome light filter 8 to an eye of a user.

Referring to FIG. 1B groups 10 of mono-chrome light filters 8 and their associated selective attenuation elements 4 are arranged in an N row by M column array measured by groups 10/selective attenuation elements 4 or an N row by 2M column array measured by mono-chrome light filters 8.

Each group 10 may have different colors of mono-chrome light filters 8 but they are otherwise similar. Each group 10 has its own selective attenuation element 4.

Each of the mono-chrome light filters 8 that share a common column and are therefore separated in a first direction, share a common light source 6. The light source 6 is only used for a single column of mono-chrome light filters 8 in this example and is not used for the adjacent columns that are spaced in a second direction orthogonal to the first direction.

In this example, each of the mono-chrome light filters 8 that share a common column, share a common color.

FIG. 1C illustrates a timing diagram that illustrates the relative timing for writing W an attenuation value to a selective attenuation element 4, and switching on respective first and second light sources L1 and L2.

Referring to FIG. 1C, in a first part 21 of a first time slot 20 an attenuation value is written to the selective attenuation element 4 setting a grayscale of attenuation and then in a second part 22 of the first time slot 20, the first light source (L1) is switched on until the end of the first time slot 20 and then it is switched off. The light from the first light source (L1) is attenuated by the selective attenuation element 4 before passing through the first mono-chrome light filter 8.

In a first part 25 of a second time slot 24 an attenuation value is written to the selective attenuation element 4 setting a grayscale of attenuation and then in a second part 26 of the second time slot 24, the second light source (L2) is switched on until the end of the second time slot 24 and then it is switched off. The light from the second light source (L2) is attenuated by the selective attenuation element 4 before passing through the second mono-chrome light filter 8.

In the particular example illustrated, in the first part 21 of the first time slot 20, attenuation values are simultaneously written to the selective attenuation elements 4 in alternate columns (odd columns) which are simultaneously illuminated by first light sources (L1) 6 in the second part 22 of the first time slot 20. The mono-chrome light filters 8 in a column filter light transmitted from the same first light source (L1) 6 via different selective attenuation elements 4 that are simultaneously actuated.

In an immediately following second time slot 24, attenuation values are simultaneously written to the selective attenuation elements 4 in alternate columns (even columns) which are simultaneously illuminated by second light sources (L2) 6 in the second part 26 of the second time slot 24. The mono-chrome light filters 8 in a column filter light transmitted from the same second light source (L2) via different selective attenuation elements 4 that are simultaneously actuated.

Figures 2A, 3A:
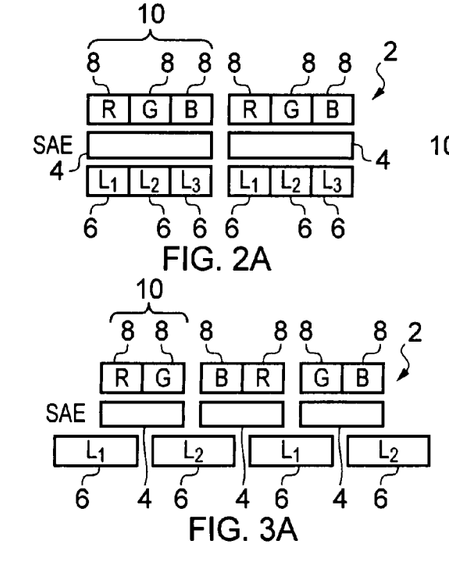
FIG. 2A illustrates another example of an apparatus in a cross-sectional view.
FIG. 3A illustrates another example of the apparatus in a cross-sectional view.
Figure 2B:
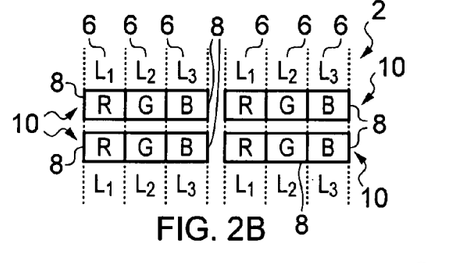
FIG. 2B illustrates the example of the apparatus from a top plan perspective.
Figure 2C:
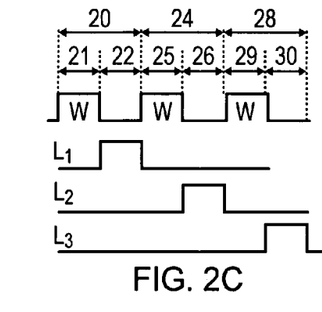
FIG. 2C illustrates an example of a timing diagram.

The FIGS. 2A to 2C illustrate an example of an apparatus 2 comprising multiple groups 10 of pixels arranged in an N row×M column array. Each group 10 of pixels is defined by an array of n rows×m columns of mono-chrome light filters 8. In the example of FIGS. 2A to 2C, n is 1 and m is 3.

FIG. 2B illustrates the apparatus 2 from a top plan perspective. FIG. 2A illustrates the apparatus 2 in a cross-sectional view taken along the horizontal in FIG. 2B.

The apparatus 2 illustrated in FIGS. 2A and 2B is similar to the apparatus 2 illustrated in FIGS. 1A and 1B except that a first light source (L1) 6 underlies a red mono-chrome light filter (R) 8, a second light source (L2) 6, adjacent the first light source (L1) 6, underlies a green mono-chrome light filter (G) 8 and a third light source (L3) 6, adjacent the second light source (L2) 6, underlies a blue mono-chrome light filter (B) 8.

As in FIGS. 1A to 1B, each pixel in a group 10 of pixels is defined by a mono-chrome light filter 8. Each group 10 of mono-chrome light filters 8 (pixels) is associated with one selective attenuation element 4, used for a plurality (three in this example) adjacent mono-chrome light filters 8 (pixels) and configured to attenuate light from multiple (three in this example) respective light sources. Each mono-chrome light filter 8 (pixel) in a group 10 is associated with a different light source 6. The selective attenuation element 4 is positioned between the mono-chrome light filters 8 of the group 10 and the light sources 6.

Light generated by the underlying first light source (L1) has a path through the selective attenuation element 4, then through the first mono-chrome light filter 8 to an eye of a user.

Light generated by the underlying second light source (L2) has a path through the same selective attenuation element 4, then through the second mono-chrome light filter 8 to an eye of a user.

Light generated by the underlying third light source (L3) has a path through the same selective attenuation element 4, then through the third mono-chrome light filter 8 to an eye of a user.

Referring to FIG. 2B, each of the mono-chrome light filters 8 that share a common column and are therefore separated in a first direction, share a common light source 6. The light source 6 is only used for a single column of mono-chrome light filters 8 in this example and is not used for the adjacent columns that are spaced in a second direction orthogonal to the first direction.

In this example, each of the mono-chrome light filters 8 that share a common column, share a common color.

FIG. 2C illustrates a timing diagram that illustrates the relative timing for writing W an attenuation value to a selective attenuation element, and switching on respective first, second and third light sources L1, L2 and L3.

There are three timeslots illustrated. The timing diagram for the first and second timeslots is the same as illustrated in FIG. 1C.

However, in a first part 29 of a third time slot 28 an attenuation value is written to the selective attenuation element 4 setting a grayscale of attenuation and then in a second part 30 of the third time slot 28, the third light source (L3) is switched on until the end of the third time slot 28 and then it is switched off. The light from the third light source (L3) is attenuated by the selective attenuation element 4 before passing through the third mono-chrome light filter 8.

In the particular example illustrated, in the first part 21 of the first time slot 20, attenuation values are simultaneously written to the selective attenuation elements 4 in columns 1, 4, 7 ... 3n+1 which are simultaneously illuminated by the first light sources (L1) 6 in the second part 22 of the first time slot 20. The mono-chrome light filters 8 in a column filter light transmitted from the same first light source (L1) 6 via different selective attenuation elements 4 that are simultaneously actuated.

In an immediately following second time slot 24, attenuation values are simultaneously written to the selective attenuation elements 4 in columns 2, 5, 8 ... 3n+2 which are simultaneously illuminated by second light sources (L2) 6 in the second part 26 of the second time slot 24. The mono-chrome light filters 8 in a column filter light transmitted from the same second light source (L2) via different selective attenuation elements 4 that are simultaneously actuated.

In the immediately following third time slot 28, attenuation values are simultaneously written to the selective attenuation elements 4 in columns 3, 6, 9 ... 3n+3 which are simultaneously illuminated by third light sources (L3) 6 in the second part 30 of the third time slot 28. The mono-chrome light filters 8 in a column filter light transmitted from the same third light source (L3) via different selective attenuation elements 4 that are simultaneously actuated.

Figure 3B:
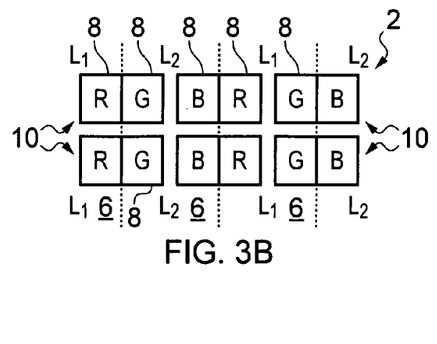
FIG. 3B illustrates the example of the apparatus from a top plan perspective.

The FIGS. 3A and 3B illustrate an example of an apparatus 2 comprising multiple groups 10 of pixels arranged in an N row×M column array. Each group 10 of pixels is defined by an array of n rows×m columns of mono-chrome light filters 8. In the example of FIGS. 3A and 3B, n is 1 and m is 2.

FIG. 3B illustrates the apparatus 2 from a top plan perspective. FIG. 3A illustrates the apparatus 2 in a cross-sectional view taken along the horizontal in FIG. 2B.

The apparatus 2 illustrated in FIGS. 3A and 3B is similar to the apparatus 2 illustrated in FIGS. 1A and 1B except that light sources 6 are shared between groups 10 in different columns. For example, a first light source in a group 10 (at location a, b in the N,M array) is also a second light source in an adjacent, preceding group (at location a, b−1 in the N,M array) and a second light source in the group 10 (at location a, b in the N,M array) is also a first light source in an adjacent, following group 10 (at location a, b+1 in the N,M array).

As in FIGS. 1A and 1B, each pixel in a group 10 of pixels is defined by a mono-chrome light filter 8. Each group 10 of mono-chrome light filters 8 (pixels) is associated with one selective attenuation element 4, used for two adjacent mono-chrome light filters 8 (pixels) and configured to attenuate light from two respective light sources 6. Each mono-chrome light filter 8 (pixel) in a group 10 is associated with a different light source 6. The selective attenuation element 4 is positioned between the mono-chrome light filters 8 of the group 10 and the light sources 6.

Light generated by the underlying first light source (L1) has a path through the selective attenuation element 4, then through the first mono-chrome light filter 8 to an eye of a user.

Light generated by the underlying second light source (L2) has a path through the same selective attenuation element 4, then through the second mono-chrome light filter 8 to an eye of a user.

Referring to FIG. 1B, each of the mono-chrome light filters that share a common column and are therefore separated in a first direction, share a common light source 6. The light source 6 is used for that single column of mono-chrome light filters 8 and is also used for the adjacent column of light filters that are spaced in a second direction orthogonal to the first direction.

In this example, each of the mono-chrome light filters 8 that share a common column, share a common color.

The timing diagram for this apparatus is the same as illustrated in FIG. 1C.

In the particular example illustrated, in the first part 21 of the first time slot 20, attenuation values are simultaneously written to the selective attenuation elements 4 in all columns (odd and even columns) which are simultaneously illuminated by first light sources (L1) 6 in the second part 22 of the first time slot 20. The mono-chrome light filters 8 in adjacent columns filter light transmitted from the same first light source (L1) 6 via different selective attenuation elements 4 that are simultaneously actuated.

In an immediately following second time slot 24, attenuation values are simultaneously written to the selective attenuation elements 4 in all columns (odd and even columns) which are simultaneously illuminated by second light sources (L2) 6 in the second part 26 of the time slot 24. The mono-chrome light filters 8 in adjacent columns filter light transmitted from the same second light source (L2) via different selective attenuation elements 4 that are simultaneously actuated.

Figure 4A:
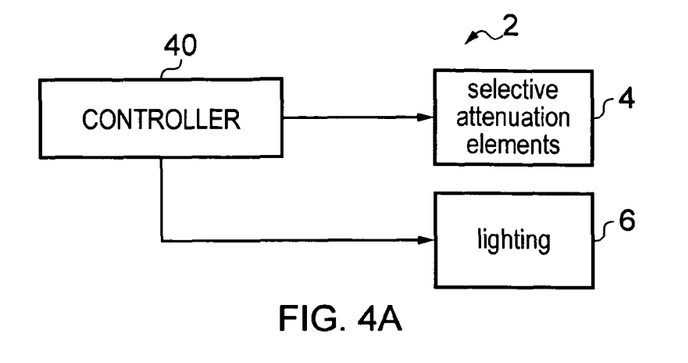
FIG. 4A illustrates an example of an apparatus that additionally comprises a controller that is configured to control the selective attenuation elements and light sources.

FIG. 4A illustrates an apparatus 2 that additionally comprises a controller 40 that is configured to control the selective attenuation elements 4 and the light sources 6 as described above.

Figure 4B:
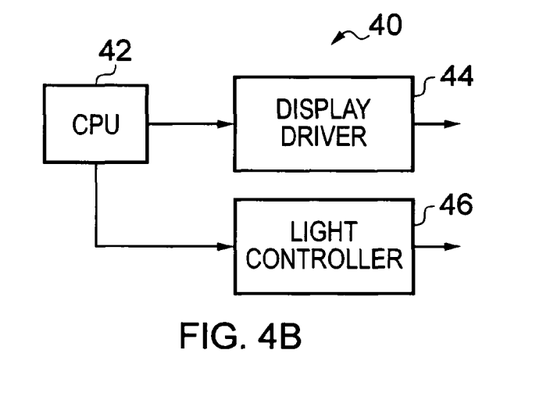
FIG. 4B illustrates an example of a controller.

FIG. 4B illustrates an example of a controller 40. In this example, the controller 40 comprises a central processor 42 that controls a display driver 44 and a light controller 46.

The display driver 44 controls the elements of a liquid crystal display that provide the selectable attenuation elements 4 and operates as an attenuation controller. It controls the selective attenuation elements 4 to have a particular attenuation in a particular time slot.

The light controller 46 is configured to control particular light sources 6 to be on in a particular time slot first and off in one or more particular time slots.

Figure 4C:
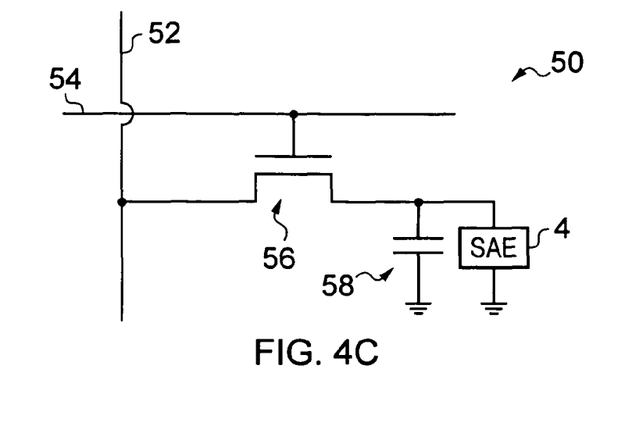
FIG. 4C illustrates an example of control circuitry for a selectable attenuation element.

FIG. 4C illustrates control circuitry for a selectable attenuation element 4.

The selective attenuation element 4 may be a selectable element in a liquid crystal display (LCD). The selectable element has, in this example, a nematic liquid crystal positioned between two cross-polarizers. In a first state, a first voltage is applied across a nematic liquid crystal. The change in polarization provided by the nematic liquid crystal is low and the attenuation by the selectable element is high. In a second state, a second voltage is applied across the nematic liquid crystal. The change in polarization provided by the nematic liquid crystal is high (90 degrees) and the attenuation by the selectable element is low. In other states the voltage applied across the nematic liquid crystal is between the first and second voltage and the change in polarization provided by the nematic liquid crystal is between low and high. The attenuation by the selectable element is a value between low and high determined by the actual voltage applied.

When the selectable attenuation element 4 is selected, the row/gate line 54 is set HIGH switching on the field effect transistor 56. The capacitor then charges to the grayscale voltage value applied via the column/source line 52. The grayscale voltage is applied across the nematic liquid crystal (LC) element 4.

When the selectable attenuation (LC) element 4 is not selected, the row/gate line 54 is set LOW switching off the field effect transistor 56. The capacitor 58 is then isolated providing the grayscale voltage across the nematic liquid crystal element 4.

Different technologies may be used to provide the light sources 6.

In one example, the light sources 6 are backlights similar to those used in liquid crystal displays. The first light source L1, the second light source L2 (and the third light source L3, if present) are separately actuated backlights In another example, the light sources 6 are light guides. The first light source L1, the second light source L2 (and the third light source L3, if present) are provided by one or more light guides.

Figure 5:
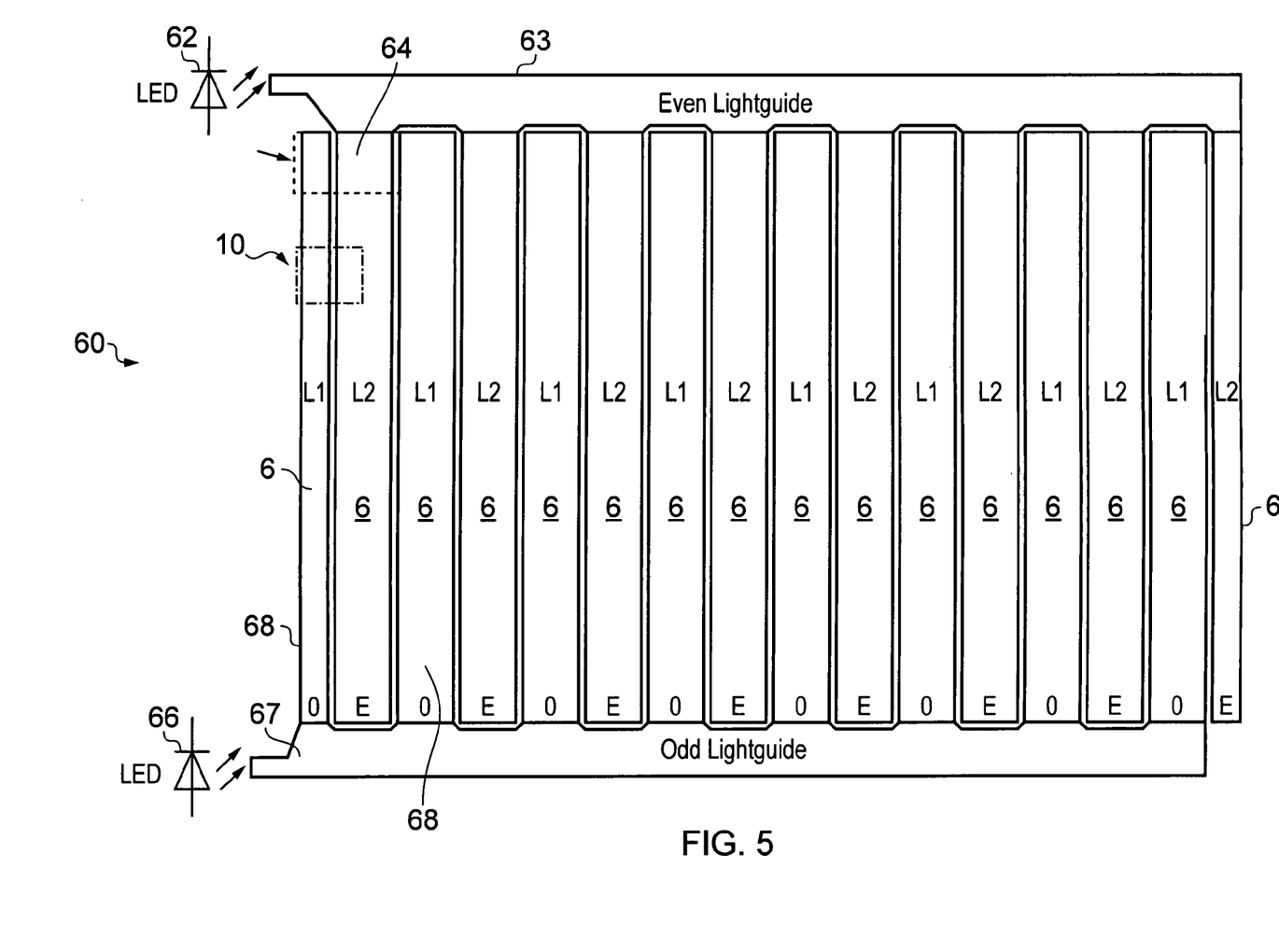
FIG. 5 illustrates an example of a lighting arrangement.

FIG. 5 illustrates a lighting arrangement 60. This lighting arrangement 60 is suitable for providing the first light source (L1) 6 and the second light source (L2) 6 in the example illustrated in FIGS. 3A and 3B.

The first light sources (L1) 6 are provided by a first light emitting diode 66 which is configured to provide light to a transverse light guide 67 which provides the light to a series of longitudinal light guides 68 that provide the first light sources to the columns of pixels.

The second light sources (L2) 6 are provided by a second light emitting diode 62 which is configured to provide light to a transverse light guide 63 which provides the light to a series of longitudinal light guides 64 that provide the second light sources (L2) to the columns of pixels.

Figure 6A:
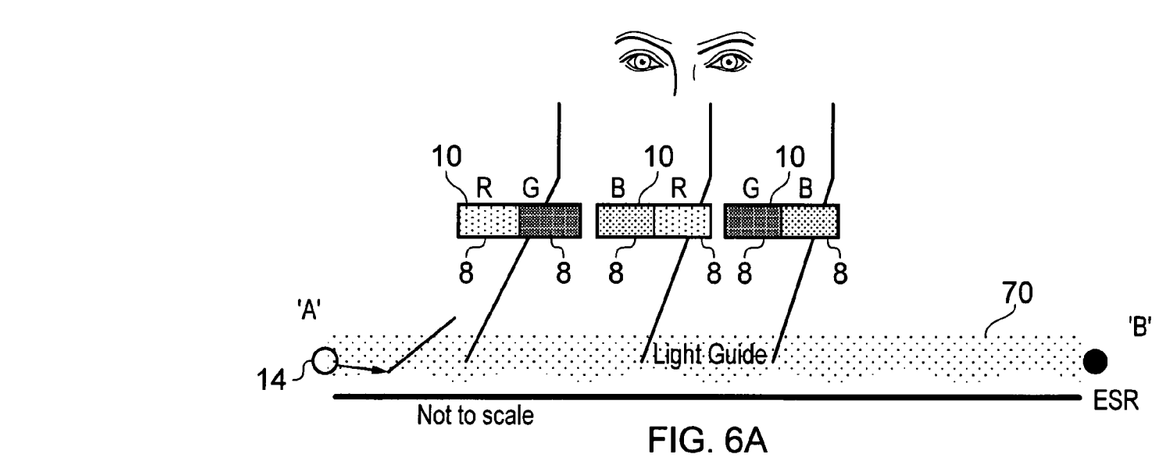
FIGS. 6A and 6B illustrate an example of alternative lighting arrangement.
Figure 6B:
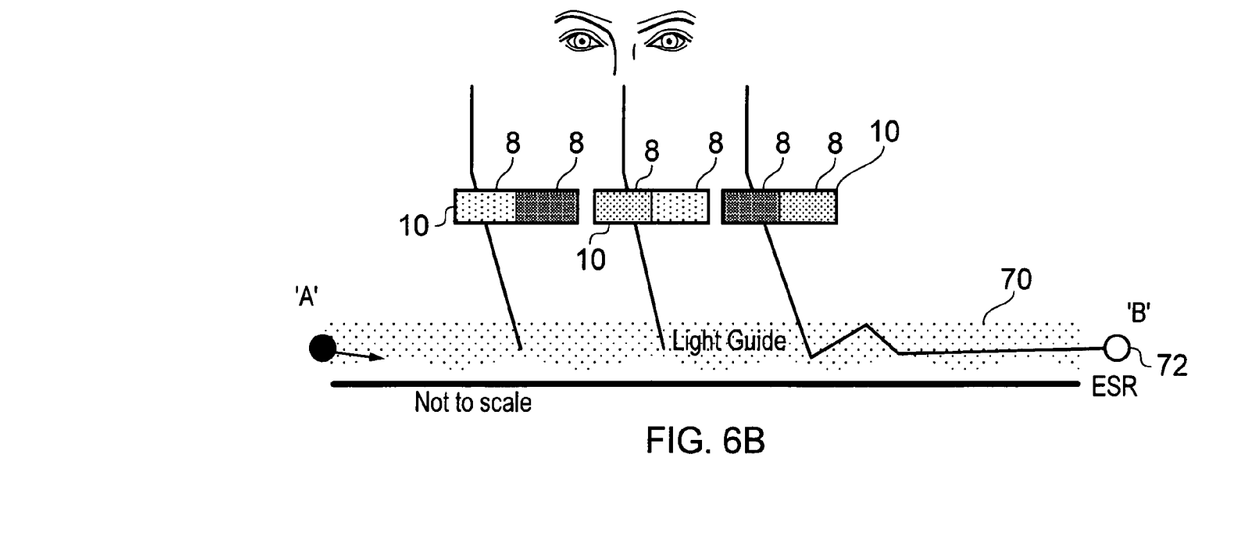

FIGS. 6A and 6B illustrate an alternative lighting arrangement 60. In this arrangement, a single light guide 70 operates as both the first light source and the second light source. Light fed into the light guide 70 from one end by a first light emitting diode 72, because of the light guide configuration, is consistently directed through the first mono-chrome light filter 6 in each group 10 of pixels and not through the second mono-chrome light filter 6 in each group 10 of pixels (FIG. 6B). Light fed into the light guide 70 from the other end by a second light emitting diode 74, because of the light guide configuration, is consistently directed through the second mono-chrome light filter 6 in each group 10 of pixels and not through the first mono-chrome light filter 6 in each group 10 of pixels.

The light sources 6 described in preceding examples typically provide a broadband (white) light source that covers the visible spectrum of electromagnetic radiation.

Figure 7:
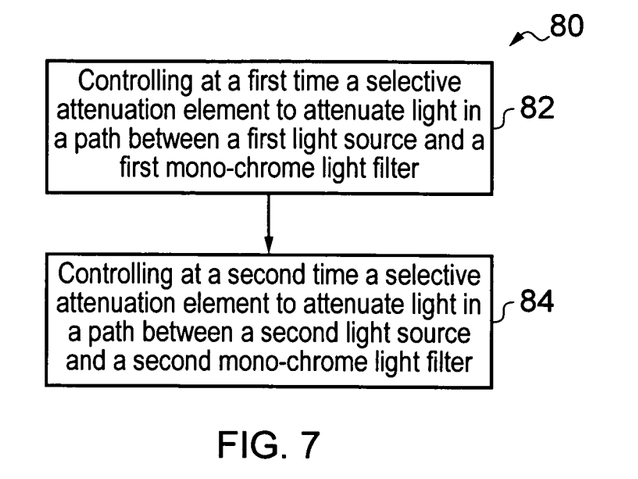
FIG. 7 illustrates an example of a method.

FIG. 7 illustrates a method 80 comprising: at block 82, controlling at a first time a selective attenuation element to attenuate light in a path between a first light source and a first mono-chrome light filter; and at block 84, controlling at a second time the selective attenuation element to attenuate light in a path between a second light source and a second mono-chrome light filter.

The method 80 may, for example, be carried out by a controller 40 as illustrated in FIG. 4A or 4B.

The controller may be implemented using instructions that enable hardware functionality, for example, by using executable computer program instructions in a general-purpose or special-purpose processor that may be stored on a computer readable storage medium (disk, memory etc) to be executed by such a processor.

Figure 8A:
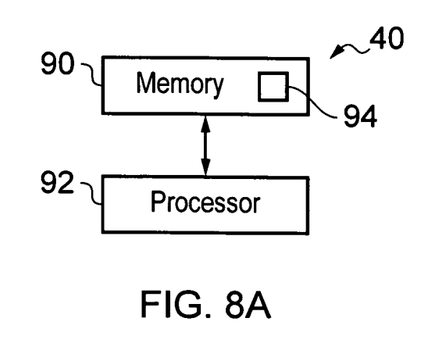
FIG. 8A illustrates an example of a controller controlled by a computer program.

Referring to FIG. 8A a controller 40 comprises a processor 92 and a memory 90. The processor 92 may be configured to read from and write to the memory 90. The processor 92 may also comprise an output interface via which data and/or commands are output by the processor 92 and an input interface via which data and/or commands are input to the processor 92.

The memory 90 may store a computer program 94 comprising computer program instructions that control the operation of the controller 40 when loaded into the processor 92. The computer program instructions provide the logic and routines that enables the controller 40 to perform the methods illustrated in the Figures. The processor 92 by reading the memory 90 is able to load and execute the computer program 94.

The apparatus 2 may therefore comprise: at least one processor 92; and at least one memory 90 including computer program code 94 the at least one memory 90 and the computer program code 94 configured to, with the at least one processor 92, cause the apparatus 2 at least to perform: controlling at a first time a selective attenuation element to attenuate light in a path between a first light source and a first mono-chrome light filter; and controlling at a second time the selective attenuation element to attenuate light in a path between a second light source and a second mono-chrome light filter.

Figure 8B:
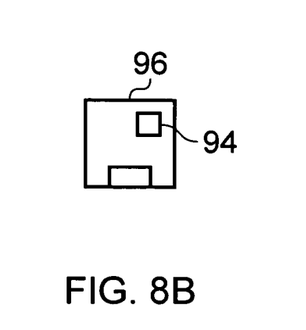
FIG. 8B illustrates an example of a delivery mechanism for a computer program.

The computer program 94 may arrive at the apparatus via any suitable delivery mechanism 96. An example is illustrated in FIG. 8B. The delivery mechanism 96 may be, for example, a computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus may propagate or transmit the computer program as a computer data signal.

As used here 'module' refers to a unit or apparatus that excludes certain parts/components that would be added by an end manufacturer or a user. The apparatus 2 may be a module. The controller 40 may be a module.

The blocks illustrated in FIG. 7 may represent steps in a method and/or sections of code in the computer program 94. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, the embodiments described above describe red, green, blue (RGB) pixel clusters. However, it is known to have different colors form a cluster. As one example, a cluster may comprise cyan, magenta, yellow mono-chrome light filters 8 for the pixels in the cluster. As another example, a cluster may comprise red, green blue, white (RGBW) mono-chrome light filters 8 for the pixels in the cluster.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one shared light source;
   a first selective attenuation element, used for a first plurality of adjacent pixels and configured to attenuate light from the at least one shared light source;
   a first group of adjacent mono-chrome light filters, used for the first plurality of adjacent pixels, the first group comprising:
   a first mono-chrome light filter belonging to the first group of adjacent mono-chrome light filters, for a first one of the first plurality of adjacent pixels, configured to filter light transmitted via the first selective attenuation element for the first one of the first plurality of adjacent pixels; and
   a second mono-chrome light filter belonging to the first group of adjacent mono-chrome light filters, for a second one of the first plurality of adjacent pixels, configured to filter light transmitted via the first selective attenuation element for the second one of the first plurality of adjacent pixels;
   a second selective attenuation element, used for a second plurality of adjacent pixels and configured to attenuate light from the at least one shared light source;
   a second group of adjacent mono-chrome light filters, used for the second plurality of adjacent pixels, the second group comprising:
   a first mono-chrome belonging to the second group of adjacent mono-chrome light filters, for a first one of the second plurality of adjacent pixels, configured to filter light transmitted via the second selective attenuation element for the first one of the second plurality of adjacent pixels; and
   a second mono-chrome light filter belonging to the second group of adjacent mono-chrome light filters, for a second one of the second plurality of adjacent pixels, configured to filter light transmitted via the second selective attenuation element for the second one of the second plurality of adjacent pixels,
   wherein the at least one shared light source is shared between the first selective attenuation element and the second selective attenuation element.

2. An apparatus as claimed in claim 1, further comprising: a first shared light source for the first mono-chrome light filter belonging to the first group of adjacent mono-chrome light filters and for the first mono-chrome light filter belonging to the second group of adjacent mono-chrome light filters, and a second shared light source for the second mono-chrome light filter belonging to the first group of adjacent mono-chrome light filters and for the second mono-chrome ht filter belonging to the second group of adjacent mono-chrome light filters.

3. An apparatus as claimed in claim 2, wherein the first shared light source that is a light source for the first mono-chrome light filter belonging to the first group of adjacent mono-chrome light filters is also a light source for another mono-chrome light filter , belonging to the second group of adjacent mono-chrome light filters, that is separated from the first mono-chrome light filter belonging to the first group of adjacent mono-chrome light filters in a first direction.

4. An apparatus as claimed in claim 3, wherein the another mono-chrome light filter belonging to the second group of adjacent mono-chrome light filters is a color filter of a first color and the first mono-chrome light filter belonging to the first group of adjacent mono-chrome light filters is a color filter of the first color.

5. An apparatus as claimed in claim 3, wherein the first and second selective attenuation elements are simultaneously actuated.

6. An apparatus as claimed in claim 3, wherein the first shared light source is not a light source for a further mono-chrome light filter that is separated from the first mono-chrome light filter belonging to the first group of adjacent mono-chrome light filters in a second direction orthogonal to the first direction.

7. An apparatus as claimed in claim 3, wherein the first shared light source is a light source for a further mono-chrome light filter that is separated from the first mono-chrome light filter belonging to the first group of adjacent mono-chrome light filters in a second direction orthogonal to the first direction.

8. An apparatus as claimed in claim 7, wherein the further mono-chrome light filter is a color filter of a first color and the first mono-chrome light filter belonging to the first group of adjacent mono-chrome light filters is a color filter of a different color to the first color.

9. An apparatus as claimed in claim 7, wherein the first mono-chrome light filter belonging to the first group of adjacent mono-chrome light filters and the further mono-chrome light filter are configured to filter light transmitted via different selective attenuation elements that are simultaneously actuated.

10. An apparatus as claimed in claim 2, further comprising a light controller configured to control the first shared light source to be on in a first time slot and off in a second time slot and to control the second shared light source to be on in the second time slot and off in the first time slot.

11. An apparatus as claimed in claim 2, further comprising -an attenuation controller configured to control the first selective attenuation element to have a first selected attenuation in a first time slot and to have a second selected attenuation in a second time slot, and to control the second selective attenuation element to have a third selected attenuation in the first time slot and to have a fourth selected attenuation in the second time slot.

12. An apparatus as claimed in claim 2, wherein the first shared light source and the second shared light source are separately actuated backlights.

13. An apparatus as claimed in claim 2, wherein the first shared light source comprises a first series of longitudinal light guides including a first longitudinal light guide and a second longitudinal light guide, the first longitudinal light guide being configured to provide light to the first mono-chrome light filter belonging to the first group of adjacent mono-chrome light filters and the second longitudinal light guide being configured to provide light to the first mono-chrome light filter belonging to the second group of adjacent mono-chrome light filters; and wherein the second shared light source comprises a second series of longitudinal light guides including a third longitudinal light guide and a fourth longitudinal light guide, the third longitudinal light guide being configured to provide light to the second mono-chrome light filter belonging to the first group of adjacent mono-chrome light filters and the fourth longitudinal light guide being configured to provide light to the second mono-chrome light filter belonging to the second group of adjacent mono-chrome light filters.

14. An apparatus as claimed in claim 13, wherein the longitudinal light guides are arranged so that the third longitudinal light guide is between the first longitudinal light guide and the second longitudinal light guide, and the second longitudinal light guide is between the third longitudinal light guide and the fourth longitudinal light guide.

15. A method comprising:
controlling at a first time a first selective attenuation element to attenuate light in a path between a first shared light source and a first mono-chrome light filter belonging to a first group of adjacent mono-chrome light filters;
controlling at the first time a second selective attenuation element to attenuate light in a path between the first shared light source and a first mono-chrome light filter belonging to a second group of adjacent mono-chrome light filters;
controlling at a second time the first selective attenuation element to attenuate light in a path between a second shared light source and a second mono-chrome light filter belonging to the first group of adjacent mono-chrome light filters; and
controlling at the second time the second selective attenuation element to attenuate light in a path between the second shared light source and a second mono-chrome light filter belonging to the second group of adjacent mono-chrome light filters.

16. A method as claimed in claim 15, comprising:
controlling the first shared light source to be on in the first time slot and directing light towards the first mono-chrome light filter belonging to the first group of adjacent mono-chrome light filters and towards the first mono-chrome light filter belonging to the second group of adjacent mono-chrome light filters;
controlling the first shared light source to be off in the second time slot; controlling the second shared light source to be on in the second time slot and directing light towards the second mono-chrome light filter belonging to the first group of adjacent mono-chrome light filters and towards the second mono-chrome light filter belonging to the second group of adjacent mono-chrome light filters;
controlling the second shared light source to be off in the first time slot; controlling the first selective attenuation element to have a first selected attenuation in the first time slot and to have a second selected attenuation in the second time slot; and
controlling the second selective attenuation element to have a third selected attenuation in the first time slot and to have a fourth selected attenuation in the second time slot.

17. A method as claimed in claim 15, comprising:
sharing the first shared light source between multiple mono-chrome light filters of the same color that are associated with different selective attenuation elements;
simultaneously actuating the different selective attenuation elements.

18. A method as claimed in claim 15, comprising:
sharing the first shared light source between multiple mono-chrome light filters of different colors that are associated with different selective attenuation elements;
simultaneously actuating the different selective attenuation elements.

19. An apparatus as claimed in claim 1, wherein the first mono-chrome light filter belonging to the first group of adjacent mono-chrome light filters is a color filter of a first color and the first mono-chrome light filter belonging to the second group of adjacent mono-chrome light filters is a color filter of the same first color.

20. An apparatus comprising:
at least one processor; and
at least one non-transitory memory including computer program code, wherein the at least one memory and the computer program code are configured, with the at least one processor, to cause the apparatus to at least:
control at a first time a first selective attenuation element to attenuate light in a path between a first shared light source and a first mono-chrome light filter belonging to a first group of adjacent mono-chrome light filters;
control at the first time a second selective attenuation element to attenuate light in a path between the first shared light source and a first mono-chrome light filter belonging to a second group of adjacent mono-chrome light filters;
control at a second time the first selective attenuation element to attenuate light in a path between a second shared light source and a second mono-chrome light filter belonging to the first group of adjacent mono-chrome light filters; and
control at the second time the second selective attenuation element to attenuate light in a path between the second shared light source and a second mono-chrome light filter belonging to the second group of adjacent mono-chrome light filters.

* * * * *

UNITED STATES PATENT AND TRADEMARK OFFICE
CERTIFICATE OF CORRECTION

PATENT NO. : 8,564,628 B2  
APPLICATION NO. : 13/013965  
DATED : October 22, 2013  
INVENTOR(S) : Juha H-P Nurmi and Jani E. Penttila Page 1 of 1

It is certified that error appears in the above-identified patent and that said Letters Patent is hereby corrected as shown below:

In the Claims:

In Claim 1:  
Column 9, line 38, "mono-chrome belonging" should be deleted and --mono-chrome light filter belonging-- should be inserted.

In Claim 2:  
Column 9, line 60, "mono-chrome ht filter" should be deleted and --mono-chrome light filter-- should be inserted.

In Claim 11:  
Column 10, line 42, "-an" should be deleted and --an-- should be inserted.

Signed and Sealed this  
Twenty-fourth Day of December, 2013

Margaret A. Focarino  
*Commissioner for Patents of the United States Patent and Trademark Office*